US008364522B1

(12) United States Patent  (10) Patent No.: US 8,364,522 B1
Gevelber  (45) Date of Patent: Jan. 29, 2013

(54) METHOD AND SYSTEM FOR PROVIDING A SMALL BUSINESS COUPON DISTRIBUTION SYSTEM

(75) Inventor: Lisa Cohen Gevelber, Palo Alto, CA (US)

(73) Assignee: Intuit Inc., Mountain View, CA (US)

(*) Notice: Subject to any disclaimer, the term of this patent is extended or adjusted under 35 U.S.C. 154(b) by 884 days.

(21) Appl. No.: 12/022,339

(22) Filed: Jan. 30, 2008

(51) Int. Cl.
*G06Q 40/00* (2006.01)
(52) U.S. Cl. .................. 705/14; 705/5; 705/10; 705/26
(58) Field of Classification Search .................. 705/14, 705/5, 10, 26
See application file for complete search history.

(56) References Cited

U.S. PATENT DOCUMENTS

| | | | |
|---|---|---|---|
| 5,353,218 A | 10/1994 | De Lapa et al. | |
| 5,754,938 A | 5/1998 | Herz et al. | |
| 5,819,285 A | 10/1998 | Damico et al. | |
| 6,341,353 B1 | 1/2002 | Herman et al. | |
| 6,363,488 B1 | 3/2002 | Ginter et al. | |
| 6,450,407 B1 | 9/2002 | Freeman et al. | |
| 6,611,811 B1* | 8/2003 | Deaton et al. | 705/14.39 |
| 6,678,685 B2 | 1/2004 | McGill et al. | |
| 6,918,131 B1 | 7/2005 | Rautila et al. | |
| 7,403,906 B2 | 7/2008 | Coleman | |
| 7,505,913 B2 | 3/2009 | Tobin | |
| 7,668,747 B2 | 2/2010 | Murphy et al. | |
| 7,783,532 B2 | 8/2010 | Hsu et al. | |
| 7,877,402 B1 | 1/2011 | Weiss et al. | |
| 2001/0014868 A1 | 8/2001 | Herz et al. | |
| 2002/0019764 A1 | 2/2002 | Mascarenhas | |
| 2002/0040321 A1* | 4/2002 | Nicholson | 705/14 |

(Continued)

FOREIGN PATENT DOCUMENTS

| | | |
|---|---|---|
| GB | 2 430 297 | 3/2007 |
| JP | 2003-067606 | 3/2003 |

(Continued)

OTHER PUBLICATIONS

Brown, Mark Graham, Journal for Quality & Participation ? v17n6 ? pp. 6-11, Oct./Nov. 1994.*

(Continued)

*Primary Examiner* — Tien Nguyen
(74) *Attorney, Agent, or Firm* — McKay and Hodgson, LLP; Philip McKay; Sean P. Lewis

(57) ABSTRACT

A method and system for providing a small business a coupon distribution system includes a process for coupon distribution to select consumers whereby a coupon provider defines at least one coupon eligibility criterion that must be met by a consumer in order for the consumer to be eligible to receive a given coupon. The coupon provider also provides coupon offer data including, but not limited to, the terms of the coupon, contact information for the coupon provider, and a logo and/or trademark associated with the coupon provider. The data representing the at least one coupon eligibility criterion and coupon offer data is then provided to the process for coupon distribution to select consumers. Financial data for one or more consumers is then obtained from one or more sources using a computing system implemented financial management system. Using the data representing the at least one coupon eligibility criterion and the consumer's financial data, one or more consumers are identified that are eligible to receive the coupon from the coupon provider. The identified consumers are then provided the one coupons and/or coupon offer data.

20 Claims, 3 Drawing Sheets

U.S. PATENT DOCUMENTS

| | | | |
|---|---|---|---|
| 2002/0062249 A1 | 5/2002 | Iannacci | |
| 2002/0077892 A1 | 6/2002 | Goring | |
| 2002/0082620 A1* | 6/2002 | Lee | 606/151 |
| 2002/0138345 A1 | 9/2002 | Dickson et al. | |
| 2002/0169664 A1 | 11/2002 | Walker et al. | |
| 2002/0174011 A1* | 11/2002 | Sanchez et al. | 705/14 |
| 2003/0009402 A1 | 1/2003 | Mullen et al. | |
| 2003/0018523 A1* | 1/2003 | Rappaport et al. | 705/14 |
| 2003/0093287 A1 | 5/2003 | Lowery | |
| 2003/0105689 A1* | 6/2003 | Chandak et al. | 705/35 |
| 2003/0158844 A1* | 8/2003 | Kramer et al. | 707/6 |
| 2003/0195806 A1 | 10/2003 | Willman et al. | |
| 2003/0212595 A1* | 11/2003 | Antonucci | 705/14 |
| 2003/0233276 A1 | 12/2003 | Pearlman et al. | |
| 2004/0024638 A1 | 2/2004 | Restis | |
| 2004/0049452 A1 | 3/2004 | Blagg | |
| 2004/0056101 A1 | 3/2004 | Barkan et al. | |
| 2004/0140361 A1 | 7/2004 | Paul et al. | |
| 2005/0171841 A1 | 8/2005 | Prorock et al. | |
| 2005/0171955 A1 | 8/2005 | Hull et al. | |
| 2005/0256756 A1 | 11/2005 | Lam et al. | |
| 2006/0143183 A1 | 6/2006 | Goldberg et al. | |
| 2006/0212355 A1 | 9/2006 | Teague et al. | |
| 2006/0229946 A1 | 10/2006 | Scroggie et al. | |
| 2006/0282310 A1 | 12/2006 | Burch | |
| 2007/0050258 A1* | 3/2007 | Dohse | 705/14 |
| 2007/0094114 A1* | 4/2007 | Bufford et al. | 705/35 |
| 2007/0118394 A1 | 5/2007 | Cahoon | |
| 2007/0121843 A1 | 5/2007 | Atazky et al. | |
| 2007/0129998 A1 | 6/2007 | Postrel | |
| 2007/0174116 A1 | 7/2007 | Keith et al. | |
| 2007/0205274 A1 | 9/2007 | Bridges | |
| 2007/0250380 A1 | 10/2007 | Mankoff | |
| 2007/0288312 A1 | 12/2007 | Wang | |
| 2008/0071614 A1 | 3/2008 | Mebruer | |
| 2008/0086365 A1 | 4/2008 | Zollino et al. | |
| 2008/0154714 A1 | 6/2008 | Liu et al. | |
| 2008/0195462 A1 | 8/2008 | Magdon-Ismail et al. | |
| 2008/0195476 A1 | 8/2008 | Marchese et al. | |
| 2009/0076912 A1 | 3/2009 | Rajan et al. | |
| 2010/0042471 A1 | 2/2010 | Chang et al. | |

FOREIGN PATENT DOCUMENTS

| | | |
|---|---|---|
| WO | 01/040980 | 6/2001 |
| WO | WO-2004/055701 | 7/2004 |
| WO | WO-2005/122020 | 12/2005 |

OTHER PUBLICATIONS

Ken W. Gadd, Business Process Re-Engineering & Management Journal ? v1 n3 ?pp. 66, 1995.*

PR Newswire, Monday, Apr. 1, 2002 ? 07:44 EDT.*

Del Favero et al., "Method and System for Providing Sellers Access to Selected Consumers", U.S. Appl. No. 11/875,682, filed Oct. 19, 2007.

Gevelber et al., "Method and System for Finding and Providing Coupons to Consumers", U.S. Appl. No. 11/924,937, filed Oct. 26, 2007.

Weiss et al., "Method and System for Using a Point-of Sale System to Correlate Transactions to a Coupon Database", U.S. Appl. No. 11/925,180, filed Oct. 26, 2007.

Weiss, "Method and System for Competitive Offer Targeting Using a Coupon Database", U.S. Appl. No. 11/930,884, filed Oct. 31, 2007.

Weiss et al., "Method and System for Coupon Distribution Based on Electronic Receipt Data", U.S. Appl. No. 11/963,534, filed Dec. 21, 2007.

Gevelber et al., "Method and System for Providing Relevant Coupons to Consumers Based on Financial Transaction History and Network Search Activity", U.S. Appl. No. 12/016,537, filed Jan. 18, 2008.

Weiss et al., "Method and System for Identifying and Marketing to Groups of Consumers Based on Financial Data", U.S. Appl. No. 12/019,069, filed Jan. 24, 2008.

Weiss et al., "Method and System for Using Consumer Financial Data in Product Market Analysis", U.S. Appl. No. 12/059,878, filed Mar. 31, 2008.

Ferrell et al., "Method and System for Providing Consumers Incentive to Re-Distribute Marketing Devices", U.S. Appl. No. 12/107,946, filed Apr. 23, 2008.

Cassanego et al., "Method and System for Providing Dynamic Coupons", U.S. Appl. No. 12/323,846, filed Nov. 26, 2008.

Zackrison et al., "Method and System for Providing Coupon Recommendations", U.S. Appl. No. 12/323,888, filed Nov. 26, 2008.

Laliberte, "Frame Display Options are Possible", Forum: HyperNews Source, Aug. 13, 1997, 1 page.

Dalit, "Method and System for Sharing Marketing Devices," U.S. Appl. No. 12/960,764, filed Dec. 6, 2010.

Roper et al., "Method and System for Sharing Marketing Devices Based on Location Data," U.S. Appl. No. 13/218,144, filed Aug. 25, 2011.

Roth, "Get Rich Slowly: Personal Finance that Makes Cents", Mint.com, Nov. 14, 2007, 9 pages [online]. Retrieved on Jan. 3, 2012 from URL: <http://www.getrichslowly.org/blog/2007>.

Trent, "The Simple Dollar," Simple Dollar Online Personal Financial Analysis Tools, Jan. 31, 2008, 4 pages [online]. Retrieved on Jan. 3, 2012 from URL:<http://www.thesimpledollar.com/2008/01/31online-personal-finance-analysis-tools-some-thoughts-on-quicken-online-mint-and-wesable/>.

No author provided, "Mint.com Free Personal Finance Web-app is Now Live," Mint.com, Oct. 2007, 8 pages [online], Retrieved from URL: <http://www.stopbuyingcrap.com/online-banking/mintcom-free-personal-finance-web-app-is-now-live/>.

No author provided, "Quicken 2006 Financial Planning Software," Official Quicken Site, 2 pages [online], Retrieved on Mar. 12, 2012 from URL: <http://web.archive.org/web/20051020000622/http://quicken.intuit.com/?>.

* cited by examiner

300

Send my offer to:                                          301

303   Up to [  500  ] people 305   who live within [ 15 ] miles of 307   my address: [ 111 First Street ]

313   Here's my offer (500 characters max):
                                                               311
      20% off all purchases over $50.00

Here's my logo      [ Upload logo ]
                                                               321
      (optional):

FIG.3

METHOD AND SYSTEM FOR PROVIDING A SMALL BUSINESS COUPON DISTRIBUTION SYSTEM

BACKGROUND

Many providers of consumer goods and services, and other advertisers, offer coupons, and/or other marketing devices such as discount certificates, price guarantees, and vouchers, to consumers in an effort to attract and/or encourage business. Traditionally, coupons have been distributed in "hard-copy", typically printed, form by various means, including, but not limited to: by mail; in newspapers; in magazines; in flyers and inserts; at store front and/or product displays; and/or as attachments to store receipts (i.e., printed on the back of a receipt or appended to a receipt). More recently, coupons have been offered/distributed using electronic coupon distribution and marketing means such as, but not limited to: networks of computing systems, including public networks such as the Internet; through and/or on web-sites; as functions associated with network search engines; by e-mail; as electronic coupon attachments to electronic receipts; and as electronic coupon attachments to transactional data, such as, but not limited to transactional data from and/or displayed by, banks, credit card companies, and other financial institutions.

Many coupons offer significant discounts to the consumer holding, and meeting the terms of, the coupon. Therefore, the coupons themselves, as well as the coupon distribution means, can represent a significant expense to the coupon provider. Typically, the coupon provider is willing to incur this expense, if economically feasible, to meet specific coupon provider goals, including, but not limited to: to help build up a customer base; to get consumers into a store; to retain customers who find a lower price for an item from a competitor; to lure customers away from a competitor; and/or to help clear excess inventory and/or to boost sales of a given product.

As noted, many coupon providers are willing accept the expense of a coupon program in order to meet specific coupon provider goals, if the expense is economically feasible. However, some potential coupons providers, particularly small and/or new businesses, don't find traditional printed format coupon programs cost effective, nor do they find sophisticated, and often even more expensive, electronic coupon distribution and marketing means cost effective. In addition, many coupon providers, and in particular, small businesses, do not have the time, money, and/or technical expertise to learn, much less master, currently available electronic coupon distribution and marketing means.

In addition, in order to most efficiently use their marketing and/or advertising resources, coupon providers, and small business coupon providers in particular, would often like to send coupons, or special coupons, to select consumers who are particularly desirable to the coupon provider. For instance, a coupon provider may be particularly interested in targeting select consumers with coupons, or special coupons, who shop with a competitor, or spend a threshold amount of money each month on products and/or services the coupon provider offers. A coupon provider may also be particularly interested in targeting select consumers of specific economic and social demographics, or who reside and/or shop in a specific geographic location. In other instances, a coupon provider may be particularly interested in targeting select consumers with coupons, or special coupons, who meet any other criteria of interest.

Despite the desire of coupon providers, and, in particular, small businesses, to target select consumers with coupons in a simple and "user-friendly" way, there currently is often no information, or not complete enough information, available to the coupon provider about a given consumer to enable the coupon provider to accurately identify the consumer as a desirable consumer. Consequently, currently, most targeting of select consumers is attempted using sophisticated electronic coupon distribution and marketing means that, as discussed above, often are not practical for smaller and/or newer businesses with limited time, money and resources.

Even in the few cases where limited information about a given consumer is available, the information is typically obtained from a single source, such as transactional data associated with a single credit card account, and/or as provided by the consumer themselves. Therefore the currently available information is typically incomplete, often unverified, and often only available to larger retailers, advertisers and other coupon providers, such as the retailer offering the credit card account that is the single source of information.

As a result of the situation discussed above, coupon providers and, in particular, small business coupon providers, are denied the ability to easily and quickly identify and target particularly desirable consumers for coupon distribution. In addition, the desirable consumers are also denied savings that would otherwise be provided to them through the coupons, if the information were available to identify them and a relatively simple coupon distribution system was available. Consequently, the current situation represents a disservice to both coupon providers and consumers.

SUMMARY

In accordance with one embodiment, a method and system for coupon distribution to select consumers includes a process for coupon distribution to select consumers whereby, in one embodiment, a coupon provider defines at least one coupon eligibility criterion that must be met by a consumer in order for the consumer to be eligible to receive one or more coupons. In one embodiment, the coupon provider also provides coupon offer data including, but not limited to, the terms of the coupon, contact information for the coupon provider, and, optionally, a logo and/or trademark associated with the coupon provider. In one embodiment, the data representing the at least one coupon eligibility criterion and coupon offer data is then provided to the process for coupon distribution to select consumers. In one embodiment, financial data, including historical purchases data, for one or more consumers is obtained from one or more sources, in one embodiment, using a computing system implemented financial management system. In one embodiment, using the data representing the at least one coupon eligibility criterion and the consumer's financial data, one or more consumers are identified that are eligible to receive one or more coupons from the coupon provider, i.e., one or more consumers are identified that meet the coupon provider's coupon eligibility criterion. In one embodiment, the eligible consumers are then provided the one of more coupons and/or coupon offer data, in one embodiment, automatically, without further coupon provider action being required.

In one embodiment, a coupon provider defines at least one coupon eligibility criterion in order to target select consumers having characteristics the coupon provider finds particularly desirable. For instance, in one embodiment, the coupon provider criteria can include, but are not limited to: a consumer living within a defined distance of the coupon provider; consumer's having made purchases from one or more identified product and/or service providers, such as competitors of the coupon provider; consumers who spend a defined threshold amount of money in a defined timeframe in a specific category of store, such as $100.00 or more per month in a specific category of store; consumers who spend a defined threshold amount of money in a defined timeframe on specific products and/or services, such as $100.00 or more per month on specific products and/or services; consumers who shop with the coupon provider, or other identified product and/or service providers a threshold number of times over a defined timeframe, such as regular customer's of the coupon provider or consumers who shop 3 times or more a month at an identified product and/or service provider; consumers who have recently purchased specific products and/or services, such as products and/or services related to the products and/or services offered by the coupon provider; consumers who shop in a defined geographic location; consumers who have a defined income and/or discretionary spending budget; consumers who meet various economic and social demographics; and/or any other criteria considered desirable by a coupon provider.

In one embodiment, the coupon provider provides the at least one coupon eligibility criterion to the process for coupon distribution to select consumers via a user interface and a user interface device, such as defined herein known in the art at the time of filing, or as developed thereafter.

In one embodiment, access to the data representing the at least one coupon eligibility criterion is then provided to the process for coupon distribution to select consumers, either directly or through a computing system implemented financial management system that implements, includes, is accessible by, and/or is otherwise associated with the process for coupon distribution to select consumers.

In one embodiment, financial data is obtained by process for coupon distribution to select consumers from one or more sources for one or more consumer using a computing system implemented financial management system as defined herein, known in the art at the time of filing, or as developed thereafter.

In one embodiment, the coupon provider provides coupon offer data including, but not limited to, the terms of the coupon, contact information for the coupon provider, and, optionally, a logo and/or trademark associated with the coupon provider to process for coupon distribution to select consumers via a user interface and a user interface device, such as defined herein, known in the art at the time of filing, or as developed thereafter.

In one embodiment, the same user interface is used by the coupon provider to provide process for coupon distribution to select consumers both the at least one coupon eligibility criterion and the coupon offer data.

In one embodiment, using the data representing the at least one coupon eligibility criterion and the consumer's financial data, one or more consumers are identified that are eligible to receive the coupon from the coupon provider and, in one embodiment, the identified consumers are then provided the coupons and/or coupon offer data, automatically. In one embodiment, the identified consumers are provided the coupons and/or coupon offer data through the computing system implemented financial management system.

Using the method and system for coupon distribution to select consumers disclosed herein, a coupon provider is given the ability to distribute coupons to select consumers, who meet the coupon eligibility criteria defined by the coupon provider, efficiently and relatively easily. Using the method and system for coupon distribution to select consumers disclosed herein, consumers meeting the coupon eligibility criteria are identified using financial data from various sources, in one embodiment, as obtained using a computing system implemented financial management system. Therefore, using the method and system for coupon distribution to select consumers disclosed herein, consumers meeting the coupon eligibility criteria are identified based on more complete and verifiable financial data than is typically currently available through any one source of financial data and/or consumer provided data.

In addition, in on embodiment, the coupon provider enters data representing the at least one coupon eligibility criterion, and the coupon offer itself, through a single user interface and then the coupons are automatically distributed to eligible consumers. Consequently, using the method and system for coupon distribution to select consumers disclosed herein, the coupon providers are able to target select consumers based on more complete and accurate information, and provide those eligible consumers one or more coupons automatically, without the need for further action on the part of the coupon provider. As a result, not only are the coupon providers given the ability to identify and target particularly desirable consumers for coupon distribution easily, but the desirable consumers are also provided savings that would likely not be provided to them absent the method and system for coupon distribution to select consumers disclosed herein.

BRIEF DESCRIPTION OF THE DRAWINGS

FIG. 3 shows one embodiment of a user interface display including a coupon eligibility criterion data entry and coupon offer fields, in accordance with one embodiment.

Figure 1:
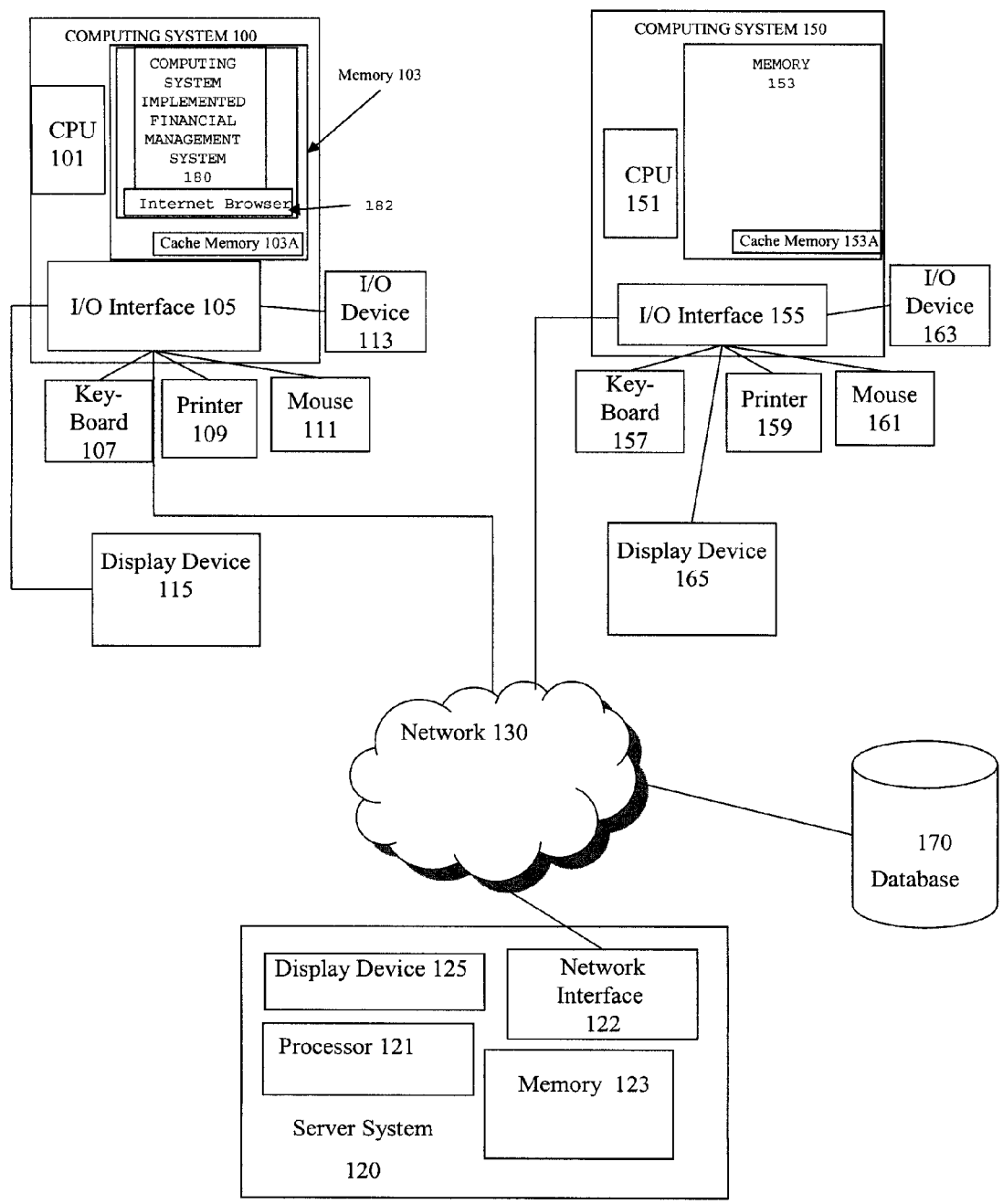
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for coupon distribution to select consumers includes a process for coupon distribution to select consumers whereby, in one embodiment, a coupon provider defines at least one coupon eligibility criterion that must be met by a consumer in order for the consumer to be eligible to receive one or more coupons. In one embodiment, the coupon provider also provides coupon offer data including, but not limited to, the terms of the coupon, contact information for the coupon provider, and, optionally, a logo and/or trademark associated with the coupon provider. In one embodiment, the data representing the at least one coupon eligibility criterion and coupon offer data is then provided to the process for coupon distribution to select consumers. In one embodiment, financial data for one or more consumers is obtained from one or more sources, in one embodiment, using a computing system implemented financial management system. In one embodiment, using the data representing the at least one coupon eligibility criterion and the consumer's financial data, one or more consumers are identified that are eligible to receive one or more coupons from the coupon provider, i.e., one or more consumers are identified that meet the coupon provider's coupon eligibility criterion. In one embodiment, the eligible consumers are then provided the one of more coupons and/or coupon offer data, in one embodiment, automatically, without further coupon provider action being required.

Hardware System Architecture

FIG. 1 is a block diagram of an exemplary hardware architecture for implementing one embodiment of a system and method for coupon distribution to select consumers, such as exemplary process 200 (FIG. 2) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented financial management system 180 such as any computing system implemented financial management system defined herein, known in the art at the time of filing, and/or as developed thereafter. In one embodiment, computing system implemented financial management system 180 is stored, in whole, or in part, in memory system 103, and is used by, or includes, or is accessed by, a process for coupon distribution to select consumers, such as exemplary process 200 (FIG. 2) discussed below.

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for coupon distribution to select consumers and/or a computing system implemented financial management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, computing system 100 is a computing system accessible by one or more consumers and/or coupon providers and used, and/or accessible, by another computing system, such as computing system 150 (discussed below). Computing systems 100 and 150 can be any computing system as defined herein, and/or as known in the art at the time of filing, and/or as developed thereafter, that includes components that can execute all, or part, of a process for coupon distribution to select consumers, and/or a computing system implemented financial management system, in accordance with at least one of the embodiments as described herein.

In one embodiment, computing system 100 is used, controlled, and/or accessible by, a provider of and/or a system and process for coupon distribution to select consumers and data representing all, or part, of coupon eligibility criteria data, and/or coupon offer data, and/or financial data associated with one or more consumers, is stored in computing system 100, typically in accounts associated with a given consumer. In one embodiment, computing system 100 is used, controlled, and/or accessible by, a provider of and/or a computing system implemented financial management system and data representing all, or part, of financial data associated with one or more consumers is stored in computing system 100, typically in accounts associated with a given consumer.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 is used, controlled, and/or accessible by one or more coupon providers, and/or consumers, and is used, and/or accessible, by another computing system, such as computing system 100. In one embodiment, computing system 150 is used, controlled, and/or accessible by, a provider of and/or a system and process for coupon distribution to select consumers and data representing all, or part, of coupon eligibility criteria data, and/or coupon offer data, and/or financial data associated with one or more consumers is stored in computing system 150, typically in accounts associated with a given consumer. In one embodiment, computing system 150 is used, controlled, and/or accessible by, a provider of and/or a computing system implemented financial management system and data representing all, or part, of financial data associated with one or more consumers is stored in computing system 150, typically in accounts associated with a given consumer.

As discussed in more detail below, in one embodiment, all, or part, of a process for coupon distribution to select consumers, and/or a computing system implemented financial management system, can also be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of a consumer, and/or the consumer's agents, a coupon provider, and/or the coupon provider's agents, and/or a process for coupon distribution to select consumers, and/or a computing system implemented financial management system.

In one embodiment, database 170 is used, controlled, and/or accessible by, a provider of and/or a system and process for coupon distribution to select consumers and data representing all, or part, of coupon eligibility criteria data, and/or coupon offer data, and/or financial data associated with one or more consumers is stored in database 170. In one embodiment, database 170 is used, controlled, and/or accessible by, a provider of and/or a computing system implemented financial management system and data representing all, or part, of financial data associated with one or more consumers is stored in database 170.

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, server system 120 is used, controlled, and/or accessible by, a provider of and/or a system and process for coupon distribution to select consumers and data representing all, or part, of coupon eligibility criteria data, and/or coupon offer data, and/or financial data associated with one or more consumers in server system 120. In one embodiment, server system 120 is used, controlled, and/or accessible by, a provider of and/or a computing system implemented financial management system and data representing all, or part, of financial data associated with one or more consumers is stored in server system 120.

Network 130 can be any network or network system as defined herein, known in the art at the time of filing, and/or as developed after the time of filing, capable of allowing communication between two or more computing systems.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, a process for coupon distribution to select consumers, and/or a computing system implemented financial management system, and/or financial data associated with one or more consumers, and/or coupon eligibility criteria data, and/or coupon offer data, are stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for coupon distribution to select consumers, and/or a computing system implemented financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for coupon distribution to select consumers, and/or a computing system implemented financial management system, is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for coupon distribution to select consumers, and/or a computing system implemented financial management system, and/or financial data associated with one or more consumers, and/or coupon eligibility criteria data, and/or coupon offer data, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "consumer", "individual", and/or "customer" are used interchangeably to denote any party interfacing and/or interacting with a process for coupon distribution to select consumers and potentially eligible to receive one or more offers from a process for coupon distribution to select consumers, and/or a person who is the subject of, and/or target of, all, or part, of any data/information/offer obtained by, and/or generated by, a process for coupon distribution to select consumers, and/or a legal guardian of a person who is the subject of, and/or target of, all, or part, of any data/information/offer obtained by, and/or generated by, a process for coupon distribution to select consumers, and/or an authorized agent of any party interfacing and/or interacting with a process for coupon distribution to select consumers and potentially eligible to receive one or more offers from a process for coupon distribution to select consumers, and/or who is the subject of, and/or target of, all, or part, of any data/information/offer obtained by, and/or generated by, a process for coupon distribution to select consumers, and/or any other authorized party associated with any party interfacing and/or interacting with a process for coupon distribution to select consumers and potentially eligible to receive one or more offers from a process for coupon distribution to select consumers, and/or who is the subject of, and/or target of, all, or part, of any data/information/offer obtained by, and/or generated by, a process for coupon distribution to select consumers.

Herein, the term "coupon" is used to denote coupons, discount certificates, discount vouchers, sales offers, and/or any other marketing tool and/or device that is presented and/or offered to a consumer in any one or more of numerous formats and/or mediums.

Herein, the term "coupon provider" is used to denote any party that distributes and/or desires to distribute coupons, discount certificates, discount vouchers, sales offers, discount codes, and/or any other marketing tool and/or device to a consumer.

As used herein, the term "product" and "product and/or service" are used interchangeably to denote a product, a service, or both a product and a service, or multiple products and/or services that can be purchased and/or otherwise obtained by a consumer.

As used herein, the term computing system, denotes, but is not limited to: a portable computer; a workstation; a two-way pager; a cellular telephone; a smart phone; a digital wireless telephone; a Personal Digital Assistant (PDA); a media player, i.e., an MP3 Player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term computing system implemented financial management system includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented marketing device distribution systems; computing system implemented accounting and/or invoicing systems, packages, programs, modules, or applications; and various other electronic transaction driven data management systems, packages, programs, modules, or applications, whether known at the time of filling or as developed later.

As used herein, the term "network" is used to denote any network or network system that is of interest such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to a data storage means that is part of, or under the control of, any computing system, as defined, known at the time of filing, or as developed thereafter.

In accordance with one embodiment, a method and system for coupon distribution to select consumers includes a process for coupon distribution to select consumers whereby, in one embodiment, a coupon provider defines at least one coupon eligibility criterion that must be met by a consumer in order for the consumer to be eligible to receive one or more coupons. In one embodiment, the coupon provider also provides coupon offer data including, but not limited to, the terms of the coupon, contact information for the coupon provider, and, optionally, a logo and/or trademark associated with the coupon provider. In one embodiment, the data representing the at least one coupon eligibility criterion and coupon offer data is then provided to the process for coupon distribution to select consumers. In one embodiment, financial data for one or more consumers is obtained from one or more sources, in one embodiment, using a computing system implemented financial management system. In one embodiment, using the data representing the at least one coupon eligibility criterion and the consumer's financial data, one or more consumers are identified that are eligible to receive one or more coupons from the coupon provider, i.e., one or more consumers are identified that meet the coupon provider's coupon eligibility criterion. In one embodiment, the eligible consumers are then provided the one of more coupons and/or coupon offer data, in one embodiment, automatically, without further coupon provider action being required.

Figure 2:
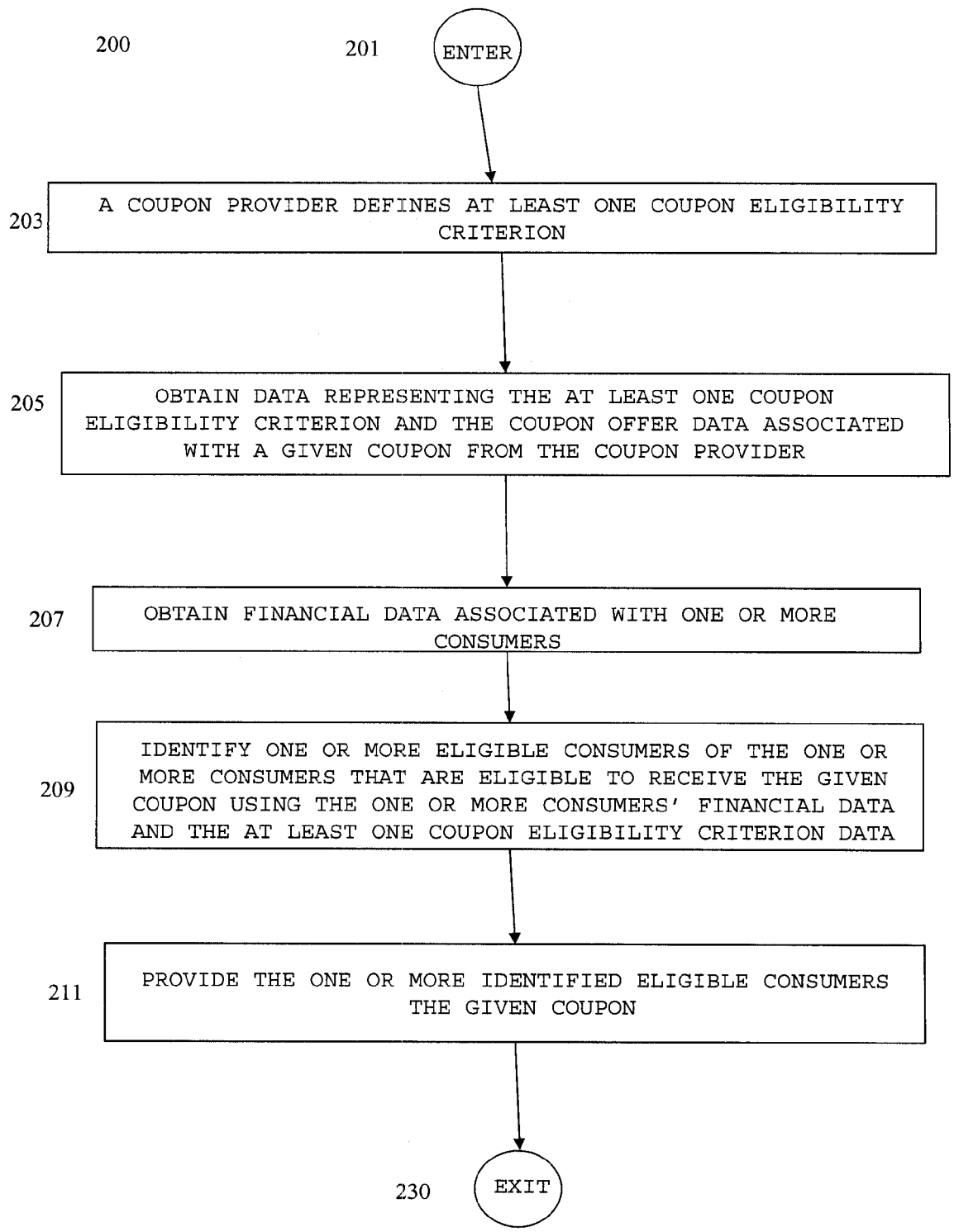
FIG. 2 is a flow chart depicting a process for coupon distribution to select consumers in accordance with one embodiment.

FIG. 2 a flow chart depicting a process for coupon distribution to select consumers 200 in accordance with one embodiment. Process for coupon distribution to select consumers 200 begins at ENTER OPERATION 201 of FIG. 2 and process flow proceeds to A COUPON PROVIDER DEFINES AT LEAST ONE COUPON ELIGIBILITY CRITERION OPERATION 203.

In one embodiment, at A COUPON PROVIDER DEFINES AT LEAST ONE COUPON ELIGIBILITY CRITERION OPERATION 203 a coupon provider defines at least one coupon eligibility criterion that must be met by a consumer in order for the consumer to be eligible to receive one or more coupons.

In one embodiment, a coupon provider defines at least one coupon eligibility criterion at A COUPON PROVIDER DEFINES AT LEAST ONE COUPON ELIGIBILITY CRITERION OPERATION 203 in order to target select consumers having characteristics the coupon provider finds particularly desirable or particularly relevant to one or more selected coupons. In one embodiment, virtually any criteria can be defined by the coupon provider. For instance, in one embodiment, the coupon provider defined eligibility criteria can include, but is not limited to, the criterion that eligible consumers must live, work, or shop within a specified distance of the coupon provider's store, and other designated location. This particular eligibility criterion is useful for developing a neighborhood-based and/or repeat local customer base. As an example, a café, dry cleaner, gym, or other neighborhood service related business might find this eligibility criterion very attractive.

As another example, in one embodiment, the coupon provider defined eligibility criteria can include, but is not limited to, the eligibility criterion that eligible consumers must have made purchases from one or more identified product and/or service providers. Using this criterion, the coupon provider can select consumers who have historically made purchases from competitors of the coupon provider allowing the coupon provider the opportunity to lure the consumer away from the competitors with special coupons and offers.

As another example, in one embodiment, the coupon provider defined eligibility criteria can include, but is not limited to, the eligibility criterion that eligible consumers must spend a defined threshold amount of money, in one example, in a defined timeframe, in a specific category of store. Using this criterion the coupon provider can target select consumers who are likely to yield a desired return on the coupon investment and are possibly patrons of the coupon provider's competition. As one example, a coupon provider may target consumers who spend $100.00 or more per month in a specific category of store, typically the coupon provider's store category.

As another example, in one embodiment, the coupon provider defined eligibility criteria can include, but is not limited to, the eligibility criterion that eligible consumers must spend a defined threshold amount of money, in one embodiment, in a defined timeframe, on specific products and/or services. Using this criterion the coupon provider can target select consumers who are likely to yield a desired return on the coupon investment and may also be patrons of the coupon provider's competitors. As one example, a coupon provider may target consumers who spend $100.00 or more per month on specific products and/or services, typically those offered by, or related to, products and/or services offered by the coupon provider.

As another example, in one embodiment, the coupon provider defined eligibility criteria can include, but is not limited to, the eligibility criterion that eligible consumers must shop with the coupon provider, or other identified product and/or service providers, a threshold number of times, in one embodiment, over a defined timeframe. Using this criterion the coupon provider can target select consumers who are repeat customers, as a loyalty reward, or consumers who are likely to yield a desired return on the investment and may also be patrons of the coupon provider's competitors. In addition, this criterion can be used to distribute a customer loyalty reward in view of a market share threat, such as a new competitor opening up down the street, or an established competitor having a sale.

As another example, in one embodiment, the coupon provider defined eligibility criteria can include, but is not limited to, the eligibility criterion that eligible consumers must have recently purchased specific products and/or services related to the products and/or services offered by the coupon provider. Using this criterion the coupon provider can target select consumers who are determined likely to make defined product and/or service purchases in the near future that are related to, and/or complement, recent consumer purchases. For instance, a coupon provider who sells home theater sound systems may wish to target consumer's who recently purchased big screen TVs with special coupons and/or offers.

As another example, in one embodiment, the coupon provider defined eligibility criteria can include, but is not limited to, the eligibility criterion that eligible consumers must have a defined income and/or discretionary spending budget. Using this criterion the coupon provider can target select consumers who are likely to yield a desired return on the investment.

As another example, in one embodiment, the coupon provider defined eligibility criteria can include, but is not limited to, the eligibility criterion that eligible consumers must shop in a defined geographic location. Using this criterion the coupon provider can target select consumers who historically shop in the coupon provider's area, or a competitor's area.

As another example, in one embodiment, the coupon provider defined eligibility criteria can include, but is not limited to, the eligibility criterion that eligible consumers must meet various economic and social demographics. Using this criterion the coupon provider can target select consumers who are likely to yield a desired return on the investment and may have special, or increased, interest in one or more of the coupon provider's products and/or services.

The specific coupon provider defined eligibility criteria discussed above are but a few specific examples of possible coupon provider defined eligibility criteria. In other embodiments, any other criterion, or combination of criteria, considered desirable by a coupon provider can be defined at A COUPON PROVIDER DEFINES AT LEAST ONE COUPON ELIGIBILITY CRITERION OPERATION 203.

In one embodiment, once a coupon provider defines at least one coupon eligibility criterion that must be met by a consumer in order for the consumer to be eligible to receive one or more coupons at A COUPON PROVIDER DEFINES AT LEAST ONE COUPON ELIGIBILITY CRITERION OPERATION 203, process flow proceeds to OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205.

In one embodiment, at OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205, data representing the at least one coupon eligibility criterion of A COUPON PROVIDER DEFINES AT LEAST ONE COUPON ELIGIBILITY CRITERION OPERATION 203 and coupon offer data describing the coupon offer and/or other coupon information is provided to process for coupon distribution to select consumers 200.

In one embodiment, at OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205, data representing the at least one coupon eligibility criterion of A COUPON PROVIDER DEFINES AT LEAST ONE COUPON ELIGIBILITY CRITERION OPERATION 203 and/or the coupon offer data is provided to process for coupon distribution to select consumers 200, either directly, or through a computing system implemented financial management system that implements, includes, is accessible by, and/or is otherwise associated with, process for coupon distribution to select consumers 200.

In one embodiment, at OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205 the coupon provider provides coupon offer to data process for coupon distribution to select consumers 200. In one embodiment the coupon offer data includes, but is not limited to: the terms of the coupon, such as the discount/price offered, any expiration data, any conditions and/or minimum purchase amounts, etc.; contact information for the coupon provider, such as an address, phone number, e-mail address, web-site, etc; and, optionally, a logo and/or trademark associated with the coupon provider.

In one embodiment, the coupon provider provides the data representing the at least one coupon eligibility criterion and the coupon offer data to process for coupon distribution to select consumers 200 via a user interface and a user interface device, such as defined herein, known in the art at the time of filing, or as developed thereafter.

In one embodiment, access to the data representing the at least one coupon eligibility criterion and/or coupon offer data is provided to process for coupon distribution to select consumers 200 at OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205 by providing process for coupon distribution to select consumers 200, and/or a computing system implemented financial management system associated with process for coupon distribution to select consumers 200, access to the data on a database, such as database 170 of FIG. 1, a computing system, such as computing systems 100 and/or 150 of FIG. 1, and/or a server system, such as server system 120 of FIG. 1, or a web-site or other web-based system, and/or using a computer program product as defined herein.

Returning to FIG. 2, in one embodiment, access to the data representing the at least one coupon eligibility criterion and/or coupon offer data is provided to process for coupon distribution to select consumers 200, and/or a computing system implemented financial management system associated with process for coupon distribution to select consumers 200, at OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205 through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1.

Returning to FIG. 2, in one embodiment, access to the data representing the at least one coupon eligibility criterion and/or coupon offer data is provided to process for coupon distribution to select consumers 200, and/or a computing system implemented financial management system associated with process for coupon distribution to select consumers 200, at OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205 through e-mail or through text messaging.

In one embodiment, access to the data representing the at least one coupon eligibility criterion and/or coupon offer data is provided to process for coupon distribution to select consumers 200, and/or a computing system implemented financial management system associated with process for coupon distribution to select consumers 200, at OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205 using any method, apparatus, process or mechanism for transferring data, images, screen displays, and/or text from one or more devices, computing systems, server systems, databases, web site/web functions and/or any devices having a data storage capability to one or more other devices, computing systems, server systems, databases, web site/web functions and/or any devices having a data storage and/or display capability, whether known at the time of filing or as thereafter developed.

As noted above, in one embodiment, at OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205, the coupon provider provides the data representing the at least one coupon eligibility criterion and the coupon offer data to process for coupon distribution to select consumers 200 via a user interface and a user interface device, such as defined herein, known in the art at the time of filing, or as developed thereafter. FIG. 3 shows one specific example of a user interface display 300 that could be used by the coupon provider to provide the data representing the at least one coupon eligibility criterion and the coupon offer data to process for coupon distribution to select consumers 200 (FIG. 2) via a user interface device at OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205.

Returning to FIG. 3, user interface display 300 includes: coupon eligibility criteria section 301; coupon offer data section 311; and logo/trademark section 321.

As seen in FIG. 3, in this one example, coupon eligibility criteria section 301 includes: number of people field 303 where the coupon provider can define the maximum number of recipients of the coupon in order to control costs; coupon eligibility criterion field 305 that, in this specific example, includes the coupon eligibility criterion of the eligible consumers living a specified distance from the coupons providers location as set forth in my address field 307. In this specific example, coupon eligibility criteria section 301 establishes that the maximum number of recipients of the coupon defined in coupon offer data section 311 is 500 (as seen in number of people field 303), and that the coupon eligibility criterion is that eligible consumers must live within 15 miles (as seen in coupon eligibility criterion field 305) of the coupon provider's address of 111 First Street (as seen in my address field 307).

As also seen in FIG. 3, in this specific example, coupon offer data section 311 indicates that the coupon is good for "20% off of all purchases over $50.00" as indicated in coupon terms field 313. As also seen in FIG. 3, in this specific example, the coupon provider has not elected to download and attach his or her logo at logo/trademark section 321.

Using user interface display 300, or any similar user interface display in accordance with one embodiment of process for coupon distribution to select consumers 200 (FIG. 2), a coupon provider can, in one embodiment, define a coupon eligibility criterion, and define the coupon itself, through a single user interface that is simple to understand and does not involve sifting through hundreds, if not thousands, of keyword possibilities and other parameters that are typically associated with currently available electronic coupon distribution and marketing means. Consequently, using user interface display 300 (FIG. 3), or a similar user interface display in accordance with one embodiment of process for coupon distribution to select consumers 200(FIG. 2), a coupon provider does not need to have sophisticated search engine skills, nor does he or she need to devote significant resources, training, or time, to defining a given coupon or to defining eligible consumer criteria. This makes user interface display 300(FIG. 3), or a similar user interface display in accordance with one embodiment of process for coupon distribution to select consumers 200(FIG. 2), particularly attractive to small and/or new business coupon providers.

Returning to FIG. 3, those of skill in the art will readily recognize that the choice of information displayed, the organization of the information displayed, and the manner in which the information is displayed in FIG. 3 was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed in FIG. 3 are possible, and that the specific means discussed above do not limit the invention as set forth in the claims below.

In one embodiment, once data representing the at least one coupon eligibility criterion and/or the coupon offer is provided to process for coupon distribution to select consumers 200 at OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205, process flow proceeds to OBTAIN FINANCIAL DATA ASSOCIATED WITH ONE OR MORE CONSUMERS OPERATION 207.

In one embodiment, at OBTAIN FINANCIAL DATA ASSOCIATED WITH ONE OR MORE CONSUMERS OPERATION 207 financial data associated with one or more consumers is obtained from one or more sources, in one embodiment, using a computing system implemented financial management system.

In one embodiment, at OBTAIN FINANCIAL DATA ASSOCIATED WITH ONE OR MORE CONSUMERS OPERATION 207 financial data representing various financial transactions conducted by a given consumer is obtained by process for coupon distribution to select consumers 200 using/from a computing system implemented financial management system.

In one embodiment, the data representing financial transactions conducted by a given consumer obtained at OBTAIN FINANCIAL DATA ASSOCIATED WITH ONE OR MORE CONSUMERS OPERATION 207 includes data associated with financial transactions conducted using multiple payment methods to provide as complete a set of consumer financial data as possible. For instance, in one embodiment, the consumer's financial transaction data is obtained at OBTAIN FINANCIAL DATA ASSOCIATED WITH ONE OR MORE CONSUMERS OPERATION 207 from, but not limited to, any one or more of the following sources: banks; debit cards and/or accounts; credit unions; credit cards and/or accounts and/or credit card/account providers; asset accounts and/or asset account providers; or other financial resources, accounts and/or services used by a consumer to pay for and/or conduct financial transactions.

In addition, in some embodiments, the one or more consumers' financial transaction data obtained at OBTAIN FINANCIAL DATA ASSOCIATED WITH ONE OR MORE CONSUMERS OPERATION 207 is obtained from multiple sources of the same type. For instance, in one embodiment, the consumer's financial transaction data is obtained at OBTAIN FINANCIAL DATA ASSOCIATED WITH ONE OR MORE CONSUMERS OPERATION 207 from: two or more banks; two or more debit cards and/or accounts; two or more credit unions; two or more credit cards and/or accounts and/or credit card/account providers; two or more asset accounts and/or asset account providers; and/or two or more other financial resources, accounts and/or services used by a consumer to pay for and/or conduct financial transactions.

As noted above, in one embodiment, all, or part, of the consumer's financial transaction data is obtained by process for coupon distribution to select consumers 200 at OBTAIN FINANCIAL DATA ASSOCIATED WITH ONE OR MORE CONSUMERS OPERATION 207 from, or using, a computing system implemented financial management system, such as computing system implemented financial management system 180, that implements, includes, is accessed by, and/or is otherwise associated with process for coupon distribution to select consumers 200 (FIG. 2).

Currently, various computing system implemented financial management systems are available including: computing system implemented personal financial management systems; computing system implemented small business financial management systems; computing system implemented home inventory systems; computing system implemented tax preparation systems; computing system implemented business accounting systems; and computing system implemented medical expense management systems; as well as various other electronic transaction data driven financial management systems.

Computing system implemented financial management systems typically help consumers/users manage their finances by providing a centralized interface with banks, credit card companies, and other various financial institutions and/or accounts, for identifying, processing, storing, and categorizing consumer financial transactions and other consumer financial data. Currently, computing system implemented financial management systems typically obtain financial transaction information, such as payee identification, payee location, payment amount, date of the transaction, time of transaction, items purchased, the type of transaction, etc., via communication with banks, credit card providers, or other financial institutions, using electronic data transfer systems such as the Open Financial Exchange (OFX) specification or various other systems for transferring financial transaction data.

As noted above, using computing system implemented financial management systems, the financial transaction information, payee identification, payee location, payment amount, date of the transaction, and other data is often used by the computing system implemented financial management system to categorize individual financial transactions as a particular type of income or expense. Some currently offered computing system implemented financial management systems then use this financial transaction information to track events, such as purchase events, and to provide various historical data reports or displays including "to date" data reports such as historical spending data reports in one or more particular categories, or with specific payees.

In one embodiment, the one or more consumers' financial transaction data obtained using one or more computing system implemented financial management systems is transferred, or otherwise made available to, process for coupon distribution to select consumers 200 at OBTAIN FINANCIAL DATA ASSOCIATED WITH ONE OR MORE CONSUMERS OPERATION 207.

In one embodiment, all, or part, of the one or more consumers' financial transaction data is obtained by process for coupon distribution to select consumers 200 at OBTAIN FINANCIAL DATA ASSOCIATED WITH ONE OR MORE CONSUMERS OPERATION 207 from invoices/bills and/or receipt data provided to process for coupon distribution to select consumers 200, and/or an associated computing system implemented financial management system, by one or more merchants and/or product and/or service providers. In one embodiment, the invoice/bill and/or receipt data includes "level 3" data indicating, among other things, the line item entry and product and/or service identification for each item purchased in the transaction.

As noted above, in one embodiment, process for coupon distribution to select consumers 200 is associated with a computing system implemented financial management system, such as computing system implemented financial management system 180 of FIG. 1, that implements, includes, is accessed by, and/or is otherwise associated with process for coupon distribution to select consumers 200 (FIG. 2). Some of these computing system implemented financial management systems provide the capability to obtain, receive, and/or process electronic copies of the invoices/receipts from one or more merchants and/or product and/or service providers, often in their specific formats, and then store the data for use by process for coupon distribution to select consumers 200 in one of numerous locations by one of numerous methods known to those of skill in the art and/or as discussed herein.

In one embodiment, all, or part, of the one or more consumers' financial transaction data is obtained by process for coupon distribution to select consumers 200, and/or a computing system implemented financial management system, at OBTAIN FINANCIAL DATA ASSOCIATED WITH ONE OR MORE CONSUMERS OPERATION 207 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct financial transactions.

In one embodiment, all, or part, of the one or more consumers' financial transaction data is obtained by process for coupon distribution to select consumers 200 at OBTAIN FINANCIAL DATA ASSOCIATED WITH ONE OR MORE CONSUMERS OPERATION 207 from user/consumer input through a user interface device such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later.

Returning to FIG. 2, in one embodiment, all, or part, of the one or more consumers' financial transaction data is obtained by process for coupon distribution to select consumers 200 at OBTAIN FINANCIAL DATA ASSOCIATED WITH ONE OR MORE CONSUMERS OPERATION 207 from any combination of the above sources and/or from any other source of a consumer's financial data, whether known at the time of filing or as developed thereafter.

In one embodiment, once the one or more consumers' financial transaction data is obtained at OBTAIN FINANCIAL DATA ASSOCIATED WITH ONE OR MORE CONSUMERS OPERATION 207, the data is stored in whole, or in part, in a database maintained by, accessible by, owned by, or otherwise related to: process for coupon distribution to select consumers 200, and/or a provider of process for coupon distribution to select consumers 200; a computing system implemented financial management system, and/or a provider of a computing system implemented financial management system; one or more coupon providers; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the one or more consumers' financial transaction data stored as described above is maintained, in whole, or in part, by: process for coupon distribution to select consumers 200, and/or a provider of process for coupon distribution to select consumers 200; a computing system implemented financial management system, and/or a provider of a computing system implemented financial management system; one or more coupon providers; a third party data storage institution; any third party service or institution; or any other parties. In these embodiments, access to the one or more consumers' financial transaction data is then provided to process for coupon distribution to select consumers 200, and/or a computing system implemented financial management system by providing access to the data and/or providing the data on a computer program product.

In one embodiment, once the one or more consumers' financial transaction data is obtained from one or more sources at OBTAIN FINANCIAL DATA ASSOCIATED WITH ONE OR MORE CONSUMERS OPERATION 207, process flow proceeds to IDENTIFY ONE OR MORE ELIGIBLE CONSUMERS OF THE ONE OR MORE CONSUMERS THAT ARE ELIGIBLE TO RECEIVE THE GIVEN COUPON USING THE ONE OR MORE CONSUMERS'FINANCIAL DATA AND THE AT LEAST ONE COUPON ELIGIBILITY CRITERION DATA OPERATION 209.

In one embodiment at IDENTIFY ONE OR MORE ELIGIBLE CONSUMERS OF THE ONE OR MORE CONSUMERS THAT ARE ELIGIBLE TO RECEIVE THE GIVEN COUPON USING THE ONE OR MORE CONSUMERS' FINANCIAL DATA AND THE AT LEAST ONE COUPON ELIGIBILITY CRITERION DATA OPERATION 209 the one or more consumers' financial transaction data of OBTAIN FINANCIAL DATA ASSOCIATED WITH ONE OR MORE CONSUMERS OPERATION 207 and the data representing the at least one coupon eligibility criterion of OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205 is used to identify/determine one or more consumers of the one or more consumers of OBTAIN FINANCIAL DATA ASSOCIATED WITH ONE OR MORE CONSUMERS OPERATION 207 that are eligible to receive the coupon of OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205.

In one embodiment, at IDENTIFY ONE OR MORE ELIGIBLE CONSUMERS OF THE ONE OR MORE CONSUMERS THAT ARE ELIGIBLE TO RECEIVE THE GIVEN COUPON USING THE ONE OR MORE CONSUMERS' FINANCIAL DATA AND THE AT LEAST ONE COUPON ELIGIBILITY CRITERION DATA OPERATION 209 the one or more consumers' financial transaction data of OBTAIN FINANCIAL DATA ASSOCIATED WITH ONE OR MORE CONSUMERS OPERATION 207 and the data representing the at least one coupon eligibility criterion of OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205 is analyzed to match and/or identify one or more consumers eligible to receive the given coupon using any one of numerous matching procedures, processes, methods, means, and/or mechanisms, well known in the art for analyzing, and/or processing, and/or comparing, and/or matching two sets of data.

A noted above, in some embodiments, the consumer's financial data of OBTAIN FINANCIAL DATA ASSOCIATED WITH ONE OR MORE CONSUMERS OPERATION 207 includes, but is not limited to: financial transaction data, such as payee identification, payee location, payment amount, date of the transaction, time of transaction, etc.; receipt information, such as level 3 line item identification receipt data; general financial data such as mortgage balances, loan balances and net worth; and various financial report data, such as gross income, net income, taxes paid, budgets, spending by category, and discretionary spending; as well as various other consumer financial data that, in many cases includes virtually all, or most, of the consumer's financial data available. Consequently, at IDENTIFY ONE OR MORE ELIGIBLE CONSUMERS OF THE ONE OR MORE CONSUMERS THAT ARE ELIGIBLE TO RECEIVE THE GIVEN COUPON USING THE ONE OR MORE CONSUMERS' FINANCIAL DATA AND THE AT LEAST ONE COUPON ELIGIBILITY CRITERION DATA OPERATION 209 any, or all, of the above information can be matched with the data representing the at least one coupon eligibility criterion of OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205 to identify one or more consumers eligible to receive the given coupon based on complete, or nearly complete, consumer financial data. This is typically in contrast to currently available systems relying on a single source of consumer financial data.

For instance, in one example, the coupon provider defined eligibility criteria of OBTAIN FINANCIAL DATA ASSOCIATED WITH ONE OR MORE CONSUMERS OPERATION 207 includes the coupon eligibility criterion that the eligible consumers must live or work within a defined distance from the coupon provider's location and/or a designated location. In this example, a given consumer's financial transaction data indicating home and/or rent payee location, property address, and/or work address of OBTAIN FINANCIAL DATA ASSOCIATED WITH ONE OR MORE CONSUMERS OPERATION 207 is used to determine the eligibility of the given consumer to receive the given coupon.

As another example, the coupon provider defined eligibility criteria of OBTAIN FINANCIAL DATA ASSOCIATED WITH ONE OR MORE CONSUMERS OPERATION 207 includes the coupon eligibility criterion that the eligible consumers must have made purchases from one or more identified product and/or service providers. In this example, a given consumer's financial transaction data indicating payee identification of OBTAIN FINANCIAL DATA ASSOCIATED WITH ONE OR MORE CONSUMERS OPERATION 207 is used to determine the eligibility of the given consumer to receive the given coupon.

In another example, the coupon provider defined eligibility criteria of OBTAIN FINANCIAL DATA ASSOCIATED WITH ONE OR MORE CONSUMERS OPERATION 207 includes the coupon eligibility criterion that the eligible consumers must spend a defined threshold amount of money in a defined timeframe in a specific category of store. In this example, a given consumer's financial transaction data indicating payee identification and payment amount of OBTAIN FINANCIAL DATA ASSOCIATED WITH ONE OR MORE CONSUMERS OPERATION 207 is used to determine the eligibility of the given consumer to receive the given coupon.

In another example, the coupon provider defined eligibility criteria of OBTAIN FINANCIAL DATA ASSOCIATED WITH ONE OR MORE CONSUMERS OPERATION 207 includes the coupon eligibility criterion that the eligible consumers must spend a defined threshold amount of money in a defined timeframe on specific products and/or services. In this example, a given consumer's financial transaction data indicating payee identification, and/or level 3 receipt data, transaction data, and payment amount data of OBTAIN FINANCIAL DATA ASSOCIATED WITH ONE OR MORE CONSUMERS OPERATION 207 is used to determine the eligibility of the given consumer to receive the given coupon.

In another example, the coupon provider defined eligibility criteria of OBTAIN FINANCIAL DATA ASSOCIATED WITH ONE OR MORE CONSUMERS OPERATION 207 includes the coupon eligibility criterion that the eligible consumers must shop with the coupon provider, or other identified product and/or service providers, a threshold number of times over a defined timeframe. In this example, a given consumer's financial transaction data indicating payee identification, transaction date, and payment amount data of OBTAIN FINANCIAL DATA ASSOCIATED WITH ONE OR MORE CONSUMERS OPERATION 207 is used to determine the eligibility of the given consumer to receive the given coupon.

In another example, the coupon provider defined eligibility criteria of OBTAIN FINANCIAL DATA ASSOCIATED WITH ONE OR MORE CONSUMERS OPERATION 207 includes the coupon eligibility criterion that the eligible consumers must have recently purchased specific products and/or services related to the products and/or services offered by the coupon provider. In this example, a given consumer's financial transaction data indicating payee identification, and/or level 3 receipt data, and transaction date data of OBTAIN FINANCIAL DATA ASSOCIATED WITH ONE OR MORE CONSUMERS OPERATION 207 is used to determine the eligibility of the given consumer to receive the given coupon.

In another example, the coupon provider defined eligibility criteria of OBTAIN FINANCIAL DATA ASSOCIATED WITH ONE OR MORE CONSUMERS OPERATION 207 includes the coupon eligibility criterion that the eligible consumers must have a defined income and/or discretionary spending budget. In this example, a given consumer's financial data indicating categorized spending data, income data, debt payment data, and/or other general income and expense data of OBTAIN FINANCIAL DATA ASSOCIATED WITH ONE OR MORE CONSUMERS OPERATION 207 is used to determine the eligibility of the given consumer to receive the given coupon.

In another example, the coupon provider defined eligibility criteria of OBTAIN FINANCIAL DATA ASSOCIATED WITH ONE OR MORE CONSUMERS OPERATION 207 includes the coupon eligibility criterion that the eligible consumers must meet various economic and social demographics. In this example, a given consumer's financial data indicating categorized spending data, and/or general income and expense data, and/or general user information data, and/or transaction data of OBTAIN FINANCIAL DATA ASSOCIATED WITH ONE OR MORE CONSUMERS OPERA- TION 207 is used to determine the eligibility of the given consumer to receive the given coupon.

In another example, the coupon provider defined eligibility criteria of OBTAIN FINANCIAL DATA ASSOCIATED WITH ONE OR MORE CONSUMERS OPERATION 207 includes the coupon eligibility criterion that the eligible consumers must shop in a defined geographic location. In this example, a given consumer's financial transaction data indicating payee location and the transaction date data of OBTAIN FINANCIAL DATA ASSOCIATED WITH ONE OR MORE CONSUMERS OPERATION 207 is used to determine the eligibility of the given consumer to receive the given coupon.

The specific examples discussed above are but a few specific examples of the numerous possible ways of using/processing the consumer's financial data of OBTAIN FINANCIAL DATA ASSOCIATED WITH ONE OR MORE CONSUMERS OPERATION 207 and the data representing the at least one coupon eligibility criterion of OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205 to identify one or more consumers eligible to receive the given coupon.

In one embodiment once one or more consumers are identified that are eligible to receive the coupon of OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205 using the consumer's financial data of OBTAIN FINANCIAL DATA ASSOCIATED WITH ONE OR MORE CONSUMERS OPERATION 207 and the data representing the at least one coupon eligibility criterion of OBTAIN DATA REPRESENTING THE AT LEAST ONE COUPON ELIGIBILITY CRITERION AND THE COUPON OFFER DATA ASSOCIATED WITH A GIVEN COUPON FROM THE COUPON PROVIDER OPERATION 205 at IDENTIFY ONE OR MORE ELIGIBLE CONSUMERS OF THE ONE OR MORE CONSUMERS THAT ARE ELIGIBLE TO RECEIVE THE GIVEN COUPON USING THE ONE OR MORE CONSUMERS' FINANCIAL DATA AND THE AT LEAST ONE COUPON ELIGIBILITY CRITERION DATA OPERATION 209, process flow proceeds to PROVIDE THE ONE OR MORE IDENTIFIED ELIGIBLE CONSUMERS THE GIVEN COUPON OPERATION 211.

In one embodiment, at PROVIDE THE ONE OR MORE IDENTIFIED ELIGIBLE CONSUMERS THE GIVEN COUPON OPERATION 211 the one or more eligible consumers are provided the coupons of IDENTIFY ONE OR MORE ELIGIBLE CONSUMERS OF THE ONE OR MORE CONSUMERS THAT ARE ELIGIBLE TO RECEIVE THE GIVEN COUPON USING THE ONE OR MORE CONSUMERS' FINANCIAL DATA AND THE AT LEAST ONE COUPON ELIGIBILITY CRITERION DATA OPERATION 209.

In one embodiment, the one or more eligible consumers are provided access to the given coupon at PROVIDE THE ONE OR MORE IDENTIFIED ELIGIBLE CONSUMERS THE GIVEN COUPON OPERATION 211 by storing data representing the coupon and then providing the one or more eligible consumers access to the coupon, either directly or through a computing system implemented financial management system.

In one embodiment, the one or more eligible consumers are provided access to the given coupon at PROVIDE THE ONE OR MORE IDENTIFIED ELIGIBLE CONSUMERS THE GIVEN COUPON OPERATION 211 by transferring data representing the given coupon to the consumer, either directly or through a computing system implemented financial management system.

In one embodiment, data representing the given coupon is provided to the one or more eligible consumers at PROVIDE THE ONE OR MORE IDENTIFIED ELIGIBLE CONSUMERS THE GIVEN COUPON OPERATION 211 through a network of computing systems and/or server systems as defined herein, known in the art at the time of filing, or developed thereafter, capable of allowing communication between two or more computing systems.

Returning to FIG. 2, in other embodiments, data representing the given coupon is provided to the one or more eligible consumers at PROVIDE THE ONE OR MORE IDENTIFIED ELIGIBLE CONSUMERS THE GIVEN COUPON OPERATION 211 through e-mail or through text messaging.

In one embodiment, data representing the given coupon is provided to the one or more eligible consumers at PROVIDE THE ONE OR MORE IDENTIFIED ELIGIBLE CONSUMERS THE GIVEN COUPON OPERATION 211 using any method, apparatus, process or mechanism for transferring data, images, screen displays, and/or text from one or more devices, computing systems, server systems, databases, web site/web functions and/or any devices having a data storage capability to one or more other devices, computing systems, server systems, databases, web site/web functions and/or any devices having a data storage and/or display capability, whether known at the time of filing or as thereafter developed.

In some embodiments, data representing the given coupon is provided to the one or more eligible consumers at PROVIDE THE ONE OR MORE IDENTIFIED ELIGIBLE CONSUMERS THE GIVEN COUPON OPERATION 211 using traditional printed coupons and/or traditional mail services.

In other embodiments, data representing the given coupon is provided to the one or more eligible consumers at PROVIDE THE ONE OR MORE IDENTIFIED ELIGIBLE CONSUMERS THE GIVEN. COUPON OPERATION 211 automatically by any of the methods discussed herein once the one or more eligible consumers are identified at IDENTIFY ONE OR MORE ELIGIBLE CONSUMERS OF THE ONE OR MORE CONSUMERS THAT ARE ELIGIBLE TO RECEIVE THE GIVEN COUPON USING THE ONE OR MORE CONSUMERS' FINANCIAL DATA AND THE AT LEAST ONE COUPON ELIGIBILITY CRITERION DATA OPERATION 209, in one embodiment, without any further action being required by the coupon provider.

In one embodiment, once the consumer is provided access to the given coupon at PROVIDE THE ONE OR MORE IDENTIFIED ELIGIBLE CONSUMERS THE GIVEN COUPON OPERATION 211, process flow proceeds to EXIT OPERATION 230. In one embodiment, at EXIT OPERATION 230, process for coupon distribution to select consumers 200 is exited to await new data.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Using process for coupon distribution to select consumers 200, a coupon provider is given the ability to distribute coupons to select consumers, who meet the coupon eligibility criteria defined by the coupon provider, efficiently and relatively easily. Using process for coupon distribution to select consumers 200, consumers meeting the coupon eligibility criteria are identified using financial data from various sources, in one embodiment, as obtained using a computing system implemented financial management system. Therefore, using process for coupon distribution to select consumers 200, consumers meeting the coupon eligibility criteria are identified based on more complete and verifiable financial data than is typically currently available through any one source of financial data and/or consumer provided data.

In addition, in one embodiment, the coupon provider enters data representing the coupon eligibility criterion, and the coupon itself, through a single user interface and then the coupons are automatically distributed to eligible consumers.

Consequently, using process for coupon distribution to select consumers 200, the coupon providers are able to target select consumers based on more complete and accurate information, and provide those eligible consumers one or more coupons automatically, without the need for further action on the part of the coupon provider. As a result, not only are the coupon providers given the ability to identify and target particularly desirable consumers for coupon distribution easily and efficiently, but the desirable consumers are also provided savings that would likely not be provided to them absent process for coupon distribution to select consumers 200.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "defining", "accessing", "analyzing", "obtaining", "deriving", "determining", "collecting", "creating", "identifying", "transferring", "storing", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for coupon distribution to select consumers comprising:
   one or more processors; and
   one or more memories coupled to the one or more processors, the one or more memories having stored therein processor executable instructions which when executed by the one or more processors perform a process comprising:
   obtaining, from a coupon provider, data representing at least one coupon eligibility criterion that a consumer must meet in order to be eligible to receive a given coupon, wherein the coupon eligibility criterion at least including a maximum number of recipients of the coupon;
   obtaining data representing the given coupon offer from the coupon provider, wherein a same user interface is used by the coupon provider to enter both the at least one coupon eligibility criterion and the coupon offer data;
   obtaining one or more consumers' financial data using a computing system implemented financial management system, the one or more consumers' financial data being associated with one or more respective consumers;
   analyzing one or more consumers' financial data and the data representing the at least one coupon eligibility criterion to identify one or more eligible consumers of the one or more consumers eligible to receive the given coupon, wherein the system is operable to consider the criterion that the eligible consumers must spend at least a defined threshold amount of money in a defined category of store, the criterion that the eligible consumers must spend at least a defined threshold amount of money on defined products and/or services, the criterion that the eligible consumers must spend at least a defined threshold amount of money in a defined category of financial transaction, and the criterion that the eligible consumers must shop with the coupon provider at least a threshold number of times; and
   providing, wherein the number of prior recipients of the coupon is less than the maximum number of recipients previously obtained, the one or more eligible consumers access to the given coupon.

2. The computing system implemented process for coupon distribution to select consumers of claim 1, wherein;
   the at least one coupon eligibility criterion that a consumer must meet in order to be eligible to receive a coupon comprises at least one coupon eligibility criterion chosen from the group of coupon eligibility criteria consisting of:
   the criterion that the eligible consumers must live within a maximum distance from a designated location;
   the criterion that the eligible consumers must have made purchases from one or more identified product and/or service providers;
   the criterion that the eligible consumers must make purchases in a defined category of financial transaction a threshold number of times;
   the criterion that the eligible consumers must have purchased defined products and/or services related to the products and/or services offered by the coupon provider;
   the criterion that the eligible consumers must shop in a defined geographic location;
   the criterion that the eligible consumers must have a defined income and/or discretionary spending budget;
   the criterion that the eligible consumers must make purchases according to a defined pattern and/or with a defined frequency; and
   the criterion that the eligible consumers must meet defined demographics.

3. The computing system implemented process for coupon distribution to select consumers of claim 1, wherein;
   the computing system implemented financial management system is a computing system implemented personal financial management system.

4. The computing system implemented process for coupon distribution to select consumers of claim 1, wherein;
   obtaining one or more consumers' financial data using a computing system implemented financial management system comprises obtaining at least part of at least one of the one or more consumers' financial data from one or more of the following sources:
   a bank;
   a debit card account;
   a credit union;
   a credit card account;
   a marketing device distribution system; and
   a network based shopping system.

5. The computing system implemented process for coupon distribution to select consumers of claim 1, wherein;
   obtaining one or more consumers' financial data using a computing system implemented financial management system comprises obtaining at least part of at least one of the one or more consumers' financial data from two or more of the following sources:
   a bank;
   a debit card account;
   a credit union; or
   a credit card account.

6. The computing system implemented process for coupon distribution to select consumers of claim 1, wherein;
   obtaining one or more consumers' financial data using a computing system implemented financial management system comprises obtaining one or more consumers' financial transaction data.

7. The computing system implemented process for coupon distribution to select consumers of claim 1, wherein;
   the one or more consumers' financial transaction data represents two or more payments made by a given one of the one or more consumers to one or more consumer payees from two or more payment sources.

8. The computing system implemented process for coupon distribution to select consumers of claim 1, wherein;
providing the one or more eligible consumers access to the given coupon comprises:
providing at least one of the one or more eligible consumers access to the given coupon automatically once the at least one of the eligible consumers is identified.

9. The computing system implemented process for coupon distribution to select consumers of claim 1, wherein;
providing the one or more eligible consumers access to the given coupon comprises:
storing data representing the given coupon and providing at least one of the one or more eligible consumers access to the data representing given coupon.

10. The computing system implemented process for coupon distribution to select consumers of claim 1, wherein;
providing the one or more eligible consumers access to the given coupon comprises:
transferring data representing the given coupon to a computing system accessible by at least one of the one or more eligible consumers.

11. The computing system implemented process for coupon distribution to select consumers of claim 10, wherein;
providing the one or more eligible consumers access to the given coupon comprises:
transferring data representing the given coupon to a computing system accessible by at least one of the one or more eligible consumers and displaying the given coupons on the computing system accessible by at the least one of one or more consumers within the context of one or more financial transactions.

12. The computing system implemented process for coupon distribution to select consumers of claim 10, wherein;
providing the one or more eligible consumers access to the given coupon comprises;
transferring data representing the given coupon to a computing system accessible by at least one of the one or more eligible consumers and displaying the given coupon on the computing system accessible by the at least one of the one or more eligible consumers within the context of one or more financial transactions that are part of a listing of transactions generated by the computing system implemented financial management system.

13. A computer program product for providing a process for coupon distribution to select consumers comprising:
a nontransitory computer readable medium;
and computer program code, encoded on the computer readable medium, comprising computer readable instructions which when executed by a processor, perform a process for:
obtaining, from a coupon provider, data representing at least one coupon eligibility criterion that a consumer must meet in order to be eligible to receive a given coupon, wherein the coupon eligibility criterion at least including a maximum number of recipients of the coupon;
obtaining data representing the given coupon offer from the coupon provider, wherein a same user interface is used by the coupon provider to enter both the at least one coupon eligibility criterion and the coupon offer data;
obtaining one or more consumers' financial data using a computing system implemented financial management system, the one or more consumers' financial data being associated with one or more respective consumers;
analyzing one or more consumers' financial data and the data representing the at least one coupon eligibility criterion to identify one or more eligible consumers of the one or more consumers eligible to receive the given coupon, wherein the system is operable to consider the criterion that the eligible consumers must spend at least a defined threshold amount of money in a defined category of store, the criterion that the eligible consumers must spend at least a defined threshold amount of money on defined products and/or services, the criterion that the eligible consumers must spend at least a defined threshold amount of money in a defined category of financial transaction, and the criterion that the eligible consumers must shop with the coupon provider at least a threshold number of times; and
providing, wherein the number of prior recipients of the coupon is less than the maximum number of recipients previously obtained, the one or more eligible consumers access to the given coupon.

14. The computer program product for providing a process for coupon distribution to select consumers of claim 13, wherein;
the at least one coupon eligibility criterion that a consumer must meet in order to be eligible to receive a coupon comprises at least one coupon eligibility criterion chosen from the group of coupon eligibility criteria consisting of:
the criterion that the eligible consumers must live within a maximum distance from a designated location;
the criterion that the eligible consumers must have made purchases from one or more identified product and/or service providers;
the criterion that the eligible consumers must make purchases in a defined category of financial transaction a threshold number of times;
the criterion that the eligible consumers must have purchased defined products and/or services related to the products and/or services offered by the coupon provider;
the criterion that the eligible consumers must shop in a defined geographic location;
the criterion that the eligible consumers must have a defined income and/or discretionary spending budget;
the criterion that the eligible consumers must make purchases according to a defined pattern and/or with a defined frequency; and
the criterion that the eligible consumers must meet defined demographics.

15. The computer program product for providing a process for coupon distribution to select consumers of claim 13, wherein;
obtaining one or more consumers' financial data using a computing system implemented financial management system comprises obtaining one or more consumers' financial transaction data.

16. The computer program product for providing a process for coupon distribution to select consumers of claim 13, wherein;
providing the one or more eligible consumers access to the given coupon comprises:
providing at least one of the one or more eligible consumers access to the given coupon automatically once the at least one of the eligible consumers is identified.

17. A system for providing a process for coupon distribution to select consumers comprising:
a computing system implemented financial management system;
means for obtaining, from a coupon provider, data representing at least one coupon eligibility criterion that a consumer must meet in order to be eligible to receive a given coupon, wherein the coupon eligibility criterion at least including a maximum number of recipients of the coupon;

means for obtaining data representing the given coupon offer from the coupon provider, wherein a same user interface is used by the coupon provider to enter both the at least one coupon eligibility criterion and the coupon offer data;

means for obtaining one or more consumers' financial data using a computing system implemented financial management system, the one or more consumers' financial data being associated with one or more respective consumers;

means for analyzing one or more consumers' financial data and the data representing the at least one coupon eligibility criterion to identify one or more eligible consumers of the one or more consumers eligible to receive the given coupon, wherein the system is operable to consider the criterion that the eligible consumers must spend at least a defined threshold amount of money in a defined category of store, the criterion that the eligible consumers must spend at least a defined threshold amount of money on defined products and/or services, the criterion that the eligible consumers must spend at least a defined threshold amount of money in a defined category of financial transaction, and the criterion that the eligible consumers must shop with the coupon provider at least a threshold number of times; and means for providing, wherein the number of prior recipients of the coupon is less than the maximum number of recipients previously obtained, the one or more eligible consumers access to the given coupon.

18. The system for providing a process for coupon distribution to select consumers of claim 17, wherein;

the at least one coupon eligibility criterion that a consumer must meet in order to be eligible to receive a coupon comprises at least one coupon eligibility criterion chosen from the group of coupon eligibility criteria consisting of:

the criterion that the eligible consumers must live within a maximum distance from a designated location;

the criterion that the eligible consumers must have made purchases from one or more identified product and/or service providers;

the criterion that the eligible consumers must make purchases in a defined category of financial transaction a threshold number of times;

the criterion that the eligible consumers must have purchased defined products and/or services related to the products and/or services offered by the coupon provider;

the criterion that the eligible consumers must shop in a defined geographic location;

the criterion that the eligible consumers must have a defined income and/or discretionary spending budget;

the criterion that the eligible consumers must make purchases according to a defined pattern and/or with a defined frequency; and the criterion that the eligible consumers must meet defined demographics.

19. The system for providing a process for coupon distribution to select consumers of claim 17, wherein;

the means for obtaining one or more consumers' financial data using the computing system implemented financial management system comprises means for obtaining one or more consumers' financial transaction data.

20. The system for providing a process for coupon distribution to select consumers of claim 17, wherein;

the means for providing the one or more eligible consumers access to the given coupon comprises:

means for providing at least one of the one or more eligible consumers access to the given coupon automatically once the at least one of the eligible consumers is identified.

* * * * *

UNITED STATES PATENT AND TRADEMARK OFFICE
CERTIFICATE OF CORRECTION

| | |
|---|---|
| PATENT NO. | : 8,364,522 B1 |
| APPLICATION NO. | : 12/022339 |
| DATED | : January 29, 2013 |
| INVENTOR(S) | : Lisa Cohen Gevelber |

It is certified that error appears in the above-identified patent and that said Letters Patent is hereby corrected as shown below:

In the Claims

In Column 28, Line 2, Claim 13, replace "system is" with --instructions are--.

Signed and Sealed this
Seventeenth Day of June, 2014

Michelle K. Lee
*Deputy Director of the United States Patent and Trademark Office*